United States Patent [19]

Kurisu et al.

[11] Patent Number: 5,766,568

[45] Date of Patent: Jun. 16, 1998

[54] METHOD OF PRODUCING COMPOSITE METAL HYDROXIDE, COMPOSITE METAL HYDROXIDE OBTAINED THEREBY AND A FLAME RETARDANT COMPOSITION OBTAINED THEREBY AND THEREWITH

[75] Inventors: Hirofumi Kurisu; Toshikazu Kodani; Atsuya Kawase; Takashi Oki, all of Ako, Japan

[73] Assignee: Tateho Chemical Industries Co., Ltd., Ako, Japan

[21] Appl. No.: 691,310

[22] Filed: Aug. 2, 1996

[30] Foreign Application Priority Data

Aug. 3, 1995 [JP] Japan .................... 7-198786

[51] Int. Cl.$^6$ .................... C01B 13/36; C01F 5/14
[52] U.S. Cl. .................... 423/593; 106/18.11; 106/18.26; 106/18.27; 252/609; 423/594; 524/435; 524/436
[58] Field of Search .................... 423/593, 594; 524/435, 436; 252/609; 106/18.11, 18.26, 18.27

[56] References Cited

U.S. PATENT DOCUMENTS

| 3,879,525 | 4/1975 | Miyata et al. | 423/593 |
|---|---|---|---|
| 5,264,284 | 11/1993 | Miyata | 423/635 |
| 5,326,549 | 7/1994 | Miyata | 423/593 |
| 5,344,636 | 9/1994 | Miyata | 423/593 |
| 5,401,442 | 3/1995 | Miyata | 423/593 |
| 5,422,092 | 6/1995 | Miyata | 423/593 |
| 5,466,740 | 11/1995 | Miyata | 423/592 |
| 5,571,526 | 11/1996 | Miyata | 423/593 |

FOREIGN PATENT DOCUMENTS

| 0 498 566 A1 | 8/1992 | European Pat. Off. . |
|---|---|---|
| 0 517 448 A1 | 12/1992 | European Pat. Off. . |
| 0 544 502 A1 | 6/1993 | European Pat. Off. . |
| 0 544 503 A1 | 6/1993 | European Pat. Off. . |
| 06-41441 | 2/1994 | Japan . |
| 07-144919 | 6/1995 | Japan . |

*Primary Examiner*—Anthony Green
*Attorney, Agent, or Firm*—Armstrong, Westerman, Hattori, McLeland & Naughton

[57] ABSTRACT

A composite metal hydroxide is produced by reacting magnesium-containing aqueous solution (X) including water soluble zinc compound wherein magnesium ion concentration is 0.01 to 1 mol/liter with alkaline material (Y) at a specific reaction equivalent ratio. Further, a composite metal hydroxide represented by the following general formula (1) is produced by hydrothermally treating thus obtained composite metal hydroxide within a temperature range of 100° to 200° C. for aging in chlorine-containing aqueous solution having a specific chlorine ion concentration:

$$Mg_{1-x}Zn_x(OH)_2 \qquad (1)$$

wherein x indicates a positive number within a range of $0.003 \leq x \leq 0.1$. A uniform metallic solid solution can be obtained as a composite metal hydroxide by the above series of processes. Further, its crystal shape can be controlled thereby so as to restrain occurrence of secondary aggregation. Still further, a flame retardant high-molecular composition obtained by including thus obtained composite metal hydroxide into a high-molecular weight composition exerts high flame retardancy and shows superiority in mechanical strength.

5 Claims, No Drawings

METHOD OF PRODUCING COMPOSITE METAL HYDROXIDE, COMPOSITE METAL HYDROXIDE OBTAINED THEREBY AND A FLAME RETARDANT COMPOSITION OBTAINED THEREBY AND THEREWITH

FIELD OF THE INVENTION

The present invention relates to a method of producing a composite metal hydroxide of a uniform solid solution, a composite metal hydroxide obtained thereby and a flame retardant high-molecular composition thereby which is superior in flame retardancy and mechanical strength.

BACKGROUND OF THE INVENTION

The demand for flame retardancy in resin compositions or rubber compositions has been increased year by year since a critical conflagration occurred in the past.

To respond to such a strong demand for improving flame retardancy, various flame retardants are marketed at present. Among all, in view of safety in manufacturing or use, the demand for improving flame retardancy has been centered on non-haloganated flame retardants. Under such a situation, metal hydroxides have come to be focused upon.

However, since a dehydration temperature of, for example, aluminium hydroxide is low (about 190° C.) among the above metal hydroxides, there is a drawback that the kinds of applicable resins are limited in order to retain a molding temperature below the temperature of dehydration. In the meantime, since an initial dehydration temperature for magnesium hydroxide is about 340° C., there is almost no limitation of the kinds of resins to be used therewith. However, a large amount should be added to obtain flame retardancy, resulting in deterioration of the physical properties inherent in resins. Namely, there have been many practical problems. To solve these problems, for example, a composite metal hydroxide is proposed in Japanese Patent Provisional Publication (Tokkaihei) 6-41441. Compared with magnesium hydroxide, a lesser amount of the composite metal hydroxide realizes flame retardancy. However, when using zinc and magnesium hydroxide for producing a composite metal hydroxide, basic salts and oxides (zinc oxides) may be generated as by-products by characteristics of zinc as a solid solution element in a conventional method. Consequently, it is difficult to obtain a composite metal hydroxide of a uniform solid solution and realize the expected properties thereof such as flame retardancy and mechanical strength.

Accordingly, it is an object of the present invention to provide a method of producing a composite metal hydroxide of a uniform solid solution having excellent flame retardancy, a composite metal hydroxide obtained thereby and a flame retardant high-molecular composition superior in mechanical strength obtained thereby and therewith.

To accomplish the above object, a first feature of the invention is to provide to a method of producing a composite metal hydroxide characterized by reacting magnesium-containing aqueous solution (X) including water soluble zinc compound wherein magnesium ion concentration is 0.01 to 1 mol/liter with alkaline material (Y) at a reaction equivalent ratio (X:Y) of X:Y=1:1.01 to 1:1.20.

A second feature of the invention is to provide a method of producing a composite metal hydroxide thereby wherein the produced composite metal hydroxide is hydrothermally treated at a temperature within a range of 100° to 200° C. in a chlorine-containing aqueous medium wherein chlorine ion concentration is 0.5 to 2.0 mol/liter.

A third feature of the invention is to provide a method of producing a composite metal hydroxide thereby wherein the produced metal hydroxide is heated in the presence of reaction mother liquor at a temperature within a range of 80° to 150° C. and only the crystal surface thereof is substituted for nickel by adding water soluble nickel compound solution.

A forth feature of the invention is to provide a composite metal hydroxide obtained by a method according to the above first or second gist represented by the following general formula (1);

$$Mg_{1-x}Zn_x(OH)_2 \qquad (1)$$

wherein x indicates a positive number within a range of 0.003 ≦x≦0.1.

A fifth feature of the invention is to provide a composite metal hydroxide obtained by a method according to the third feature represented by the following general formula (2);

$$Mg_{1-x-y}Zn_xNi_y(OH)_2 \qquad (2)$$

wherein x indicates a positive number within a range of 0.003≦x≦0.1 and y indicates a positive number within a range of 0.0≦y≦0.05

A sixth feature of the invention is to provide a flame retardant high-molecular composition containing a composite metal hydroxide represented by the general formula (1) or (2) within a range of 80 to 150 parts by weight based on 100 parts by weight of the high-molecular weight composition.

It is difficult to stably produce a composite metal hydroxide of a uniform solid solution with Mg by conventional methods, since a stable crystal shape for a hydroxide is not hexagonal. For this reason, the inventors of the present invention have conducted studies on reaction processes for obtaining a uniform solid solution. Focused upon two points, the inventors have further accumulated their studies; one is an Mg ion concentration of Zn-containing Mg aqueous solution as a source of Mg and the other is a reaction equivalent ratio of the Zn-containing Mg aqueous solution and alkaline material. As a result, they reached a conclusion that a composite metal hydroxide of a uniform solid solution represented by the above general formula (1) can be obtained by using Zn-containing Mg aqueous solution wherein Mg ion concentration is set within a range of 0.01 to 1.0 mol/liter and reacting the Zn-containing Mg aqueous solution (X) and the alkaline material (Y) at a reaction equivalent ratio of (X:Y)=1:1.01 to 1:1.20. Further, the inventors found that the occurrence of secondary aggregation can be restrained because the crystal shape of the composite metal hydroxide can be controlled by hydrothermally treating the composite metal hydroxide obtained by reaction thereof at the above reaction equivalent ratio in an aqueous medium having a specific chlorine ion concentration within a temperature range of 100° to 200° C. for aging.

Still further, the inventors reached the present invention that the composite metal hydroxide represented by the general formula (2), wherein only the crystal surface is substituted for Ni, can be obtained by heating thus obtained composite metal hydroxide within a temperature range of 80° to 150° C. in the presence of reaction mother liquor and adding water soluble Ni compound solution therein.

Even still further, the inventors found that the flame retardant high-molecular composition wherein the composite metal hydroxide represented by the general formula (1)

or (2) is contained within a range of 80 to 150 parts by weight (just abbreviated to parts hereinafter) based on 100 parts of the high-molecular compound has superior flame retardancy and satisfactory mechanical strength (such as tensile strength) even with less metal hydroxide content as compared with the conventional compositions.

DISCLOSURE OF THE INVENTION

Now, the present invention is described in detail.

The method for producing the composite metal hydroxide of the present invention comprises three steps roughly.

That is, the first step for producing the composite metal hydroxide represented by the following general formula (1) is reacting a Zn-containing Mg aqueous solution having a specific Mg ion concentration and an alkaline material at a specific equivalent ratio. This first reaction step is preferable conducted within a temperature range of 10° to 35° C.

$$Mg_{1-x}Zn_x(OH)_2 \tag{1}$$

wherein x represents a positive number within a range of $0.003 \leq x \leq 0.1$.

In the general formula (1), a value of x less than 0.003 in solid solution amount is insufficient for providing the expected effect of the composite metal hydroxide (superior flame retardancy). In the meantime, a value of x over 0.1 results in difficulty in forming a uniform solid solution, caused by basic salts and oxides as by-product, since the ionic radius of zinc is larger than that of magnesium. Further, it is difficult to control the crystal shape and easy to cause secondary aggregation, which does not bring about the expected effect for the composite metal hydroxide.

As the Zn-containing Mg aqueous solution, such a solution may be made by adding a Zn compound into an Mg aqueous solution. As a source of the Mg aqueous solution, diluted bittern, sea water, magnesium nitrate and the like are enumerated, in which Mg ion concentration should be set within a range of 0.01 to 1 mol/liter. Preferably, it is within a range of 0.03 to 0.3 mol/liter. Namely, for example, when diluted bittern or sea water is used, the Mg ion concentration over 1 mol/liter overwhelmingly causes by-products of basic salts, resulting in difficulty in forming a uniform solid solution. In addition, the Mg ion concentration may be measured by a chelatometric titration method, an ICP emission spectrochemical analysis and the like. Measurement is, however, not critical as long as it is a method for generally analyzing ion concentration in aqueous solution.

As the Zn compound to be added into the Mg aqueous solution, any water soluble zinc compound such as zinc nitrate or zinc chloride may be included without limitation. The addition amount thereof, based on the Mg aqueous solution is preferably set within the range of 0.3 to 10 mol % based on the Mg in the aqueous solution, more preferably 1 to 7 mol %. In particular, an addition amount less than 0.3 mol % is too small an amount in the solid solution to produce the expected effect of a composite metal hydroxide. On the other hand, use of over a 10 mol % results in difficulty in forming a uniform solid solution since a zinc ionic radius is larger than that of magnesium, causing basic salts and oxides as by-products. Further, it is difficult to control the crystal shape and easy to cause secondary aggregation, which shows a tendency that the expected effect of the composite metal hydroxide cannot be provided.

Still further, as the alkaline material to be reacted with the Zn-containing Mg aqueous solution having a specific Mg ion concentration, calcium hydroxide, sodium hydroxide and the like are enumerated.

Furthermore, the reaction ratio of the Zn-containing Mg aqueous solution (X) and the alkaline material (Y) at the first step is needed to be set at the equivalent ratio (X:Y)=1:1.01 to 1:1.20. Preferably, it is set at X:Y=1:1.03 to 1:1.10. Namely, when the alkaline material (Y) is less than 1.01 of the reaction equivalent ratio, by-products of basic salts may be identified, preventing formation of a uniform solid solution thereby. When the alkaline material is over 1.20, by-products of oxides may be identified, causing difficulty in controlling the crystal shape resulting in ease in occurrence of secondary aggregation.

The preferable combination of the Zn-containing Mg aqueous solution and the alkaline material at the first step is to adopt sea water (Mg aqueous solution) wherein zinc chloride, a water soluble zinc compound, is added into Zn-containing Mg aqueous solution and calcium hydroxide (limemilk), an alkaline material, in view of stability of the produced composite metal hydroxide and the manufacturing cost.

Subsequently, a method of the second step following the method of producing the composite metal hydroxide as the above first step is described here.

The second step comprises thermally treating the composite metal hydroxide represented by the general formula (1) produced in the first step in a chlorine-containing aqueous medium with a specific chlorine ion concentration within a temperature range of 100° to 200° C. for aging.

As the chlorine-containing aqueous medium, aqueous solutions of calcium chloride, sodium chloride, magnesium chloride, potassium chloride and the like are enumerated. Among all, it is preferable to use a calcium chloride aqueous solution as the chlorine-containing aqueous medium in view of controllability of the crystal shape of the composite metal hydroxide. Further, the chlorine ion concentration in the chlorine-containing aqueous medium should be set within a range of 0.5 to 2 mol/liter. Preferably, the concentration is within a range of 0.5 to 1.0 mol/liter. Namely, a low concentration of chlorine ion less than 0.5 mol/liter may cause insufficient controllability of a crystal shape of the composite metal hydroxide, resulting in the ease in occurrence of secondary aggregation. On the other hand, a high concentration of over 2 mol/liter may cause basic salts and oxides as by-products, resulting in difficulty in forming a uniform solid solution. In addition, the chlorine ion concentration may be measured by a general method for analyzing ion concentration in a solution, such as a chelatometric titration method or an ICP emission spectrochemical analysis.

Even further, as the aging conditions for the thermal treatment, the temperature should be set within a range of 100° to 200° C. and the pressure should be within a range of 0.5 to 10 kg/c m² concomitantly.

Thus obtained composite metal hydroxide is represented by the general formula (1). The crystals may further grow and secondary aggregation may decrease through the second step, which results in more preferable flame retardants in view of various properties such as compatibility with a high-molecular weight compound, dispersibility, appearance of the formed product or mechanical strength.

Next, the third step following the method of producing the composite metal hydroxide using the second step is described. The composite metal hydroxide obtained by this step is such as represented by the general formula (2), a solid solution comprising three metals of Mg, Zn and Ni.

$$Mg_{1-x-y}Zn_xNi_y(OH)_2 \tag{2}$$

wherein x represents a positive number within a range of $0.003 \leq x \leq 0.1$ and y represents a positive number within a range of $0.01 \leq y \leq 0.05$.

In the general formula (2), a value of x less than 0.003 is too small an amount of solid solution to provide the expected effect (superior flame retardancy) of the composite metal hydroxide. On the other hand, a value of x over 0.1 mol % results in difficulty in forming a uniform solid solution since the ionic diameter of zinc is larger than that of magnesium, causing by-products of basic salts and oxides. In addition, such a value may cause difficulty in controlling the crystal shape and the ease in occurrence of secondary aggregation, which does not bring about the expected effect of the composite metal hydroxide. In the meantime, a value of y less than 0.01 may cause insufficiency of nickel substitution amount on the crystal surface, which does not fully provide the expected effect of the composite metal hydroxide. In addition, a value over 0.05 may cause increase in costs and also saturation of the nickel substitution amount on the crystal surface, resulting in by-products of free nickel hydroxide and the like.

In the third step, the composite metal hydroxide represented by the general formula (1), which was produced in the second step, is heated in the presence of reaction mother liquor within a temperature range of 80° to 150° C. and a water soluble nickel compound solution is added therein so as to substitute only the crystal surface for Ni, resulting in the composite metal hydroxide represented by the general formula (2).

As the water soluble nickel composite solution, aqueous solutions of nickel chloride, nickel nitrate and the like are enumerated. Among all, it is preferable to use nickel chloride in view of reactivity with the composite metal hydroxide. Further, the mixing ratio of such a water soluble nickel compound solution is preferably set within 1 to 5 mol % based on the composite metal hydroxide of a reaction mother liquor. Particularly, it is preferable to be within 1 to 3 mol %.

In the meantime, the heating condition in adding water soluble nickel compound solution, as mentioned above, is set within a temperature range of 80° to 150° C. Particularly, it is preferable to set the condition within a temperature range of 90° to 120° C. By setting as such, it becomes possible to substitute only the crystal surface effectively with nickel. Namely, the lower temperature may cause free nickel hydroxides as by-products due to insufficient substitution. On the other hand, the higher temperature may cause excessive nickel substitution extending into the inside of the crystal structure. In both instances, the expected effect is not realized.

Thus, in the composite metal hydroxide represented by the general formula (1) through the first or second step, or represented by the general formula (2) through the third step, the crystal size is 0.2 to 4 μm, more preferably 0.2 to 2 μm, most preferably 0.5 to 1.5 μm, and that with almost no or less secondary aggregation, which means that the average secondary particle size is 0.2 to 4 μm, more preferably 0.2 to 2 μm, most preferably 0.5 to 1.5 μm, and also a BET specific surface area is 1 to 20 $m^2/g$, preferably 3 to 15 $m^2/g$, most preferably 6 to 12 $m^2/g$. Namely, since each value for the composite metal hydroxide is set within a range as above, it becomes possible to retain superior effects in compatibility with high-molecular weight compounds such as resin or rubber, dispersibility, forming capability, appearance of the formed products, mechanical strength and the like to be mentioned below. In addition, the above average secondary particle diameter is a value measured by the microtrack method on sample powder, which was dispersed by a ultrasonic treatment, in 0.2% sodium hexametaphosphate aqueous solution.

The BET specific surface area is a value in accordance with an $N_2$ adsorption method.

The thus obtained composite metal hydroxide represented by the above general formula (1) or (2), may be used as a flame retardant as it is. However, it may possible to additionally conduct a surface treatment with finishing agents such as various fatty acids, phosphoric acid esters, coupling agents and the like. The various finishing agents may be used solely or in combination of two or more.

As the various fatty acids, higher fatty acids having 10 or more carbon atoms such as stearic acid, oleic acid, erucic acid, palmitic acid, lauric acid and behenic acid, and alkali metal salts thereof may be listed In addition, as the phosphate esters, mono- or diesters of orthophosphoric acid with oleyl alcohol or stearyl alcohol, mixtures of these, acid type or alkali metal salts or amine salts thereof may be listed.

As the above coupling agents, silane-coupling agents such as vinylethoxysilane, vinyl-tris(2-methoxy-ethoxy)silane, γ-methacryloxypropyltrimethoxysilane, aminopropyltrimethoxysilane, β-(3,4 epoxycyclohexyl) ethyltrimethoxysilane, γ-mercaptopropyltrimethoxysilane, titanate coupling agents such as isopropyltriisostearoyl titanate, isopropyltris(dioctylpyrophosphate) titanateisopropyltri(N-aminoethyl-aminoethyl) titanate and isopropyltridecylbenzenesulfonyl titanate; aluminium coupling agents such as acetoalkoxyaluminium diisopropylate may be used.

As the above surface treatment with various finishing agents, a conventional moisture or dry method is available, with no limitation.

Then, by adding the composite metal hydroxide represented by the general formula (1) or (2) as a flame retardant into the high-molecular compound, a flame retardant having high-molecular weight composition can be obtained.

As the above high-molecular weight compound, general resins, rubbers and the like may be enumerated. For example, a copolymer of polyethylene or ethylene with other α-olefin, a copolymer of ethylene with vinyl acetate, ethyl acrylate or methyl acrylate, polypropylene, a copolymer of propylene with other α-olefin, polybutene-1, polystyrene, a styrene-acrylonitrile copolymer, a thermoplastic resin such as vinyl acetate, polyacrylate, polymethacrylate, polyurethane, polyester, polyether, polyamide, themosetting resins such as phenolic resin, melamine resin, epoxy resin, unsaturated polyester resin, alkyd resin, ethylene-propylene-diene rubber, styrene-butadiene rubber, acrylonitrile-butadiene rubber, butyl rubber, isoprene rubber, chlorosulfonated polyethylene and the like. These high-molecular compounds are appropriately selected.

At that time, the mixing ratio of the composite metal hydroxide represented by the general formula (1) or (2) is selected appropriately depending on the kinds of the above high-molecular compounds and the like. The mixing ratio is set within a range of 80 to 150 parts by weight based on 100 parts of the high-molecular weight compound. Particularly, it is preferably 100 to 130 parts. Namely, the mixing ratio thereof less than 80 parts may cause insufficient flame retardancy, while that over 150 parts may cause deterioration in mechanical strength such as tensile strength. Further, the composite metal hydroxide represented by the general formula (1) or (2) may be used solely or in combination as long as its mixing ratio is set within the above range.

Farther, various additives may be added appropriately other than the above composite metal hydroxide represented by the general formula (1) or (2) into the flame retardant high-molecular weight composition of the present invention.

For example, a general flame retardant aid such as carbon fine powder, red phosphorus is enumerated. Moreover, lubricants, antioxidants, ultraviolet inhibitors, antistatic agents, pigments, foaming agents, plasticizers, fillers, reinforcing materials, crosslinking agents and the like are enumerated.

The flame retardant high-molecular compound can be obtained by adding the composite metal hydroxide represented by the general formula (1) or (2) into the high-molecular weight compound at a specific ratio, mixing and then kneading thereof. As a method for mixing and kneading thereof, conventional methods such as single-screw or twin-screw extruder, a roll, a Banbury mixer and the like may be enumerated with no limitation.

Then, as a method for forming with thus obtained flame retardant high-molecular weight compound, a suitable molding method is selected appropriately depending on the kinds of the high-molecular weight compounds, the kinds of desired molded products and the like with no limitation. For example, injection molding, extrusion, blow molding, press molding, rotational molding, calendering, sheet forming, transfer molding, laminate molding, vacuum molding and the like may be enumerated.

Now, the present invention will further be described based on examples with reference to comparative examples.

EXAMPLE 1

By dissolving zinc chloride, a reagent of the first grade, into ionic bittern and diluting thereof with deionized water, a 300-liter mixture aqueous solution with 0.14 mol/liter Mg ion concentration and 0.008 mol/liter Zn ion concentration was produced. In the meantime, as the alkaline material, 51-liter limemilk with 0.9 mol/liter was produced. Both of them were mixed in such a manner that the reaction equivalent ratio of mixture aqueous solution:limemilk was 1:1.03 by charging thereof consecutively with stirring into a continuous reaction vessel of 50-liter effective volume. Then, this reactant was emulsified into calcium chloride aqueous solution with 1.0 mol/liter chlorine ion concentration, and thermally treated at 15° C., for two hours by putting thereof into an autoclave of 100-liter effective volume with a stirrer. Thereafter, it was filtrated by a filter press, washed with water, dehydrated, dried in an oven and then pulverized, thus producing the composite metal hydroxide.

EXAMPLE 2

Emulsification of the reactant in example 1 was conducted in sodium chloride aqueous solution with 0.5 mol/liter chlorine ion concentration and the thermal treatment was conducted at 170° C. for two hours. Except for that, example 2 was the same as example 1, thus producing the composite metal hydroxide.

EXAMPLE 3

By dissolving zinc nitrate, a reagent of the first grade, into ionic bittern and diluting thereof with deionized water, a 50-liter mixture aqueous solution with 1.0 mol/liter Mg ion concentration and 0.003 mol/liter Zn ion concentration was produced. In the meantime, as the alkaline material, 52-liter limemilk with 1.0 mol/liter was produced. Both of them were mixed in such a manner that the reaction equivalent ratio of mixture aqueous solution:limemilk was 1:1.04 by charging thereof consecutively with stirring into a continuous reaction vessel of 10-liter effective volume. Then, this reactant was emulsified into sodium chloride aqueous solution with 2.0 mol/liter chlorine ion concentration, and thermally treated at 150° C. for two hours by putting thereof into an autoclave of 100-liter effective volume with a stirrer. Thereafter, it was filtrated by a filter press, washed with water, dehydrated, dried in an oven and then pulverized, thus producing the composite metal hydroxide.

EXAMPLE 4

The reaction equivalent ratio of the mixture aqueous solution and limemilk of example 3 was changed in such a manner that mixture aqueous solution:limemilk was 1:1.20. Except for that, example 4 was the same as example 3, thus producing the composite metal hydroxide.

EXAMPLE 5

By dissolving magnesium nitrate and zinc nitrate, reagents of the first grade, into deionized water, 1-liter mixture aqueous solution with 0.9 mol/liter Mg ion concentration and 0.1 mol/liter Zn ion concentration was produced. In the meantime, as the alkaline material, 1-liter sodium hydroxide aqueous solution with 2.04 mol/liter was produced. Both of them were mixed in such a manner that the reaction equivalent ratio of mixture aqueous solution :sodium hydroxide was 1:1.02 by dropping the mixture aqueous solution into sodium hydroxide aqueous solution with stirring, thus producing reactant. This reactant was emulsified into sodium chloride aqueous solution with 1.0 mol/liter chlorine ion concentration, and thermally treated at 150° C. for two hours by putting thereof into an autoclave of 3-liter effective volume with a stirrer and thereafter, filtrated by a vacuum filter, washed with water, dehydrated, dried in an oven and then pulverized, thus obtaining the composite metal hydroxide.

EXAMPLE 6

Synthetic sea water was produced by adding zinc nitrate into 1530-liter decarboxylated sea water (Mg ion concentration: 0.032 mol/liter) in such a manner that Zn ion concentration was 0.002 mol/liter. In the meantime, as the alkaline material, 51-liter limemilk with 1.07 mol/liter alkali ion concentration was produced. Then, both of them were mixed in such a manner that the reaction equivalent ratio of synthetic sea water:limemilk was 1:1.05 by charging thereof consecutively with stirring into a continuous reaction vessel of 250-liter effective volume. Then, this reactant was emulsified into calcium chloride aqueous solution with 1.2 mol/liter chlorine ion concentration, and thermally treated at 150° C. for two hours by putting thereof into an autoclave of 100-liter effective volume with a stirrer Thereafter, it was filtrated by a filter press, washed with water, dehydrated, dried in an oven and then pulverized, thus producing the composite metal hydroxide.

EXAMPLE 7

The reaction mother liquor after being thermally treated at 150° C. for two hours in example 6 was cooled down to 100° C. And 3.5-liter nickel chloride aqueous solution with 0.3 mol/liter Ni ion concentration was added therein with stirring for aging with heating at 100° C. for 30 minutes. Except for that, example 7 is the same as example 6.

EXAMPLE 8

The ratio of nickel chloride aqueous solution based on the produced composite metal hydroxide was changed to 1 mol %. Except for that, example 8 was the same as example 7.

EXAMPLE 9

The ratio of nickel chloride aqueous solution based on the produced composite metal hydroxide was changed to 5 mol % and the aging condition with heating was changed to 150° C. for 30 minutes. Except for that, example 9 was the same as example 7.

EXAMPLE 10

The reaction mother liquor after being thermally treated at 150° C. for two hours in example 3 was cooled down to 100° C. And 3.9-liter nickel chloride aqueous solution with 0.4 mol/liter Ni ion concentration was added therein with stirring for aging with heating at 100° C. for 30 minutes. Except for that, example 10 is the same as example 6.

COMPARATIVE EXAMPLE 1

By dissolving zinc chloride, a reagent of the first grade, into bittern, 30-liter mixture aqueous solution with 1.7 mol/liter Mg ion concentration and 0.085 mol/liter Zn ion concentration was produced. In the meantime, as the alkaline material, 46-liter limemilk with 1.0 mol/liter alkaline ion concentration was produced. Then, both of them were charged into a continuous reaction vessel of 2.5-liter effective volume with stirring for reaction in such a manner that mixture aqueous solution:limemilk was at a reaction equivalent ratio of 1:09. Further, this reactant was put into an autoclave of 100-liter effective volume with a stirrer for thermal treatment at 150° C. for two hours. Thereafter, it was filtrated by a filter press, washed with water, dehydrated, dried in an oven and then pulverized, thus producing the composite metal hydroxide.

COMPARATIVE EXAMPLE 2

The reaction equivalent ratio of the mixture aqueous solution and the limemilk was changed to 1:1.05. Except for that, comparative example 2 was the same as comparative example 1 so as to obtain the resultant product.

COMPARATIVE EXAMPLE 3

The reaction equivalent ratio of the mixture aqueous solution and the sodium hydroxide of example 5 was changed to 1:1.25. Except for that, comparative example 3 was the same as example 5 so as to produce the resultant product.

COMPARATIVE EXAMPLE 4

The reaction equivalent ratio of the mixture aqueous solution and the sodium hydroxide of example 5 was changed to 1:1.00. Except for that, comparative example 4 was the same as example 5 so as to produce the resultant product.

COMPARATIVE EXAMPLE 5

A mixture aqueous solution of 1.1 mol/liter Mg ion concentration and 0.055 mol/liter Zn ion concentration was produced. In the meantime, the reaction equivalent ratio of the mixture aqueous solution and the limemilk was set at 1:1.05. Except for that, comparative example 5 was the same as comparative example 1.

COMPARATIVE EXAMPLE 6

The mixture aqueous solution of example 1 was changed to that of 0.14 mol/liter Mg ion concentration and 0.019 mol/liter Zn ion concentration. Except for that, comparative example 6 was the same as example 1.

COMPARATIVE EXAMPLE 7

The mixture aqueous solution of example 1 was changed to that of 0.88 mol/liter Mg ion concentration and 0.12 mol/liter Zn ion concentration. Except for that, comparative example 7 was the same as example 1.

Each chemical composition, average secondary particle diameter and BET specific surface area of thus obtained various composite metal hydroxides were measured. The results are shown in the following tables 1 and 2.

The chemical composition was quantitatively determined by an x-ray fluorescence analysis, and a chelatometric titration method, an ICP emission spectrochemical analysis or the like on the mixture wherein a composite metal hydroxide was dissolved into hydrochloric acid for quantification of content by element, and also identified and measured on lattice constant by x-ray diffraction to judge whether a uniform solid solution was realized or not.

The above average secondary particle size was measured by a microtrack method after conducting ultrasonic dispersion treatment on sample powder in 0.2% sodium hexametaphosphate aqueous solution.

The BET specific surface area was measured by an $N_2$ adsorption method.

TABLE 1

| CHEMICAL COMPOSITION | |
|---|---|
| EXAMPLES | |
| 1 | $Mg_{0.95}Zn_{0.05}(OH)_2$ |
| 2 | $Mg_{0.95}Zn_{0.05}(OH))_2$ |
| 3 | $Mg_{0.997}Zn_{0.003}(OH)_2$ |
| 4 | $Mg_{0.997}Zn_{0.003}(OH)_2$ |
| 5 | $Mg_{0.9}Zn_{0.1}(OH)_2$ |
| 6 | $Mg_{0.94}Zn_{0.06}(OH)_2$ |
| 7 | $Mg_{0.92}Zn_{0.06}Ni_{0.02}(OH)_2$ |
| 8 | $Mg_{0.93}Zn_{0.06}Ni_{0.01}(OH)_2$ |
| 9 | $Mg_{0.89}Zn_{0.06}Ni_{0.05}(OH)_2$ |
| 10 | $Mg_{0.967}Zn_{0.003}Ni_{0.03}(OH)_2$ |
| COMPARATIVE EXAMPLES | |
| 1 | $Mg(OH)_2$ + $Zn(OH)Cl$ |
| 2 | $Mg(OH)_2$ + $Zn(OH)Cl$ |
| 3 | $Mg(OH)_2$ + $ZnO$ |
| 4 | $Mg(OH)_2$ + $Zn(OH)Cl$ |
| 5 | $Mg(OH)_2$ + $Zn(OH)Cl$ |
| 6 | $Mg(OH)_2$ + $Zn(OH)Cl$ |
| 7 | $Mg(OH)_2$ + $ZnO$ |

TABLE 2

| | AVERAGE SECONDARY PARTICLE DIAMETER (μm) | BET SPECIFIC SURFACE AREA (m²/g) |
|---|---|---|
| EXAMPLES | | |
| 1 | 0.72 | 10.9 |
| 2 | 0.75 | 7.9 |
| 3 | 0.86 | 6.0 |
| 4 | 0.71 | 9.8 |
| 5 | 0.66 | 11.9 |
| 6 | 0.83 | 7.0 |
| 7 | 0.80 | 7.6 |
| 8 | 0.80 | 7.6 |
| 9 | 0.79 | 6.9 |
| 10 | 0.85 | 6.6 |
| COMPARATIVE EXAMPLES | | |
| 1 | 0.74 | 8.6 |
| 2 | 0.74 | 8.9 |
| 3 | 0.61 | 15.5 |
| 4 | 0.81 | 6.9 |
| 5 | 0.72 | 7.8 |
| 6 | 0.78 | 7.3 |
| 7 | 0.57 | 16.5 |

From the above tables 1 and 2, it is found out that a uniform id solution was obtained in every example.

EXAMPLES 11 TO 15

Next, each composite metal hydroxide (of examples) shown in the following table 3 was suspended into water respectively, heated up to 70° C. with stirring. Subsequently, sodium oleate dissolved in advance was added into the composite metal hydroxide by 2 weight % as oleic acid so as to be surface treated. Then, it was dehydrated, washed with water and dried in an oven.

Further, as a specimen, 0.2 parts antioxidant and each composite metal hydroxide (of examples), surface treated at ratios shown in the following table 3, were added based on 100 parts ethylene-ethylacrylate copolymer (ethylene acrylate content: 15 weight %, Nippon Petrochemicals Co., Ltd.) so as to be mixed in a blender. After being mixed, it was kneaded by an open-roll mixer at 130° C. and further press-molded at 160° C. so as to be made into a sheet in 1 mm thickness and a sheet in about 3.2 mm thickness (⅛ inch) respectively. Then, each of the sheets was punched into a dumbbell-shape and a strip-shape as samples respectively. These samples were subjected to a tensile test in accordance with JIS C3005 and a combustibility test in accordance with UL94VE.

TABLE 3

| | (parts) | | | | |
|---|---|---|---|---|---|
| | EXAMPLES | | | | |
| | 11 | 12 | 13 | 14 | 15 |
| COMPOSITE METAL HYDROXIDE | | | | | |
| EXAMPLE 3 | 130 | — | — | — | — |
| EXAMPLE 5 | — | 120 | — | — | — |
| EXAMPLE 7 | — | — | 110 | — | — |
| EXAMPLE 9 | — | — | — | 100 | — |
| EXAMPLE 10 | — | — | — | — | 120 |

COMPARATIVE EXAMPLES 8 TO 11

Each reaction product (of comparative examples) and $Mg(OH)_2$ shown in the following table 4 were mixed at ratios specified therein. Except for that, each sheet was formed in the same way as that of examples 12 to 19. Then, each sheet was punched into a dumbbell-shape and a stripe-shape as specimens. These specimens were subjected to a tensile test in accordance with JIS C3005 and a combustibility test in accordance with UL94VE.

TABLE 4

| | (parts) | | | |
|---|---|---|---|---|
| | COMPARATIVE EXAMPLES | | | |
| | 8 | 9 | 10 | 11 |
| COMPOSITE METAL HYDROXIDE | | | | |
| COMPARATIVE EXAMPLE 1 | 140 | — | — | — |
| COMPARATIVE EXAMPLE 7 | — | 140 | — | — |
| MG(OH)$_2$ | — | — | 140 | 150 |

The results of tensile strength and combustibility tests by using these specimens are shown in the following tables 5 and 6.

TABLE 5

| | EXAMPLES | | | | |
|---|---|---|---|---|---|
| | 11 | 12 | 13 | 14 | 15 |
| FLAME RESISTANCE TEST UL94VE (⅛ inch thickness) | V-0 | V-0 | V-0 | V-0 | V-0 |
| TENSILE STRENGTH (kgf/mm$^2$) | 0.97 | 1.03 | 1.15 | 1.21 | 1.13 |

TABLE 6

| | COMPARATIVE EXAMPLES | | | |
|---|---|---|---|---|
| | 8 | 9 | 10 | 11 |
| FLAME RESISTANCE TEST UL94VE (⅛ inch thickness) | B | B | B | V-0 |
| TENSILE STRENGTH (kfg/mm$^2$) | 0.89 | 0.78 | 0.89 | 0.79 |

From the above tables 5 and 6, it is found out that all comparative examples were low in tensile strength and inferior in mechanical strength. Further, good results were not obtained for flame retardancy on comparative examples 8 to 10. On the other hand, good results were obtained for flame retardancy on all examples although composite metal hydroxides were added in lesser amounts than in comparative examples. Still further, tensile strength on examples was superior to that of all comparative examples, which shows that all examples retain high flame retardancy as well as mechanical strength.

EFFECTS OF THE INVENTION

As the above, the composite metal hydroxide represented by the general formula (1) is produced by reacting Zn-containing Mg aqueous solution having a specific Mg ion concentration and alkaline material at a specific reaction equivalent ratio. For this reason, a composite metal hydroxide, a uniform solid solution, wherein Zn is solid solved into Mg system, which is difficult to produce in the conventional methods can be obtained. Further, the composite metal hydroxide obtained at this reaction equivalent ratio is aged in aqueous medium having a specific chlorine ion concentration at a specific temperature so as to produce the composite metal hydroxide represented by the general formula (1), whose crystal shape can be controlled, which prevents occurrence of secondary aggregation.

In addition, the composite metal hydroxide represented by the general formula (2) wherein only the crystal surface is substituted for Ni can be obtained by adding water soluble Ni compound solution into the composite metal hydroxide represented by the general formula (1) at a specific temperature in the presence of reaction mother liquor. Thus obtained composite metal hydroxide is a uniform solid solution wherein Zn is solid solved into Mg system. Therefore, the flame retardant high-molecular composition obtained by mixing the composite metal hydroxide represented by the general formula (1) or (2) at a specific volume based on the high-molecular compound exerts high flame retardancy with less content thereof compared with the conventional compositions and shows superiority in mechanical strength.

What is claimed is:

1. A method of producing a composite metal hydroxide comprising reacting aqueous solution (X) containing magnesium ions and including a water soluble zinc compound, wherein the magnesium ion concentration in the solution is 0.01 to 1 mol/liter, with alkaline material (Y) at a reaction equivalent ratio (X:Y) of X:Y=1:1.01 to 1:1.20 to produce the composite metal hydroxide.

2. A method of producing a composite metal hydroxide according to claim 1 further including hydrothermally treating the composite metal hydroxide at a temperature within a range of 100° to 200° C. in chlorine-containing aqueous medium wherein chlorine ion concentration is 0.5 to 2.0 mol/liter.

3. A method of producing a composite metal hydroxide according to claim 1 further including heating the composite metal hydroxide with reaction mother liquor at a temperature within a range of 80° to 150° C. and substituting nickel for magnesium and zinc on only a surface of crystals of the composite metal hydroxide by adding a solution of a water soluble nickel compound.

4. A composite metal hydroxide obtained by a method according to claim 3 represented by the following general formula (2);

$$Mg_{1-x-y}Zn_xNi_y(OH)_2 \qquad (2)$$

wherein x indicates a positive number within a range of $0.003 \leq x \leq 0.1$ and y indicates a positive number within a range of $0.01 \leq y \leq 0.05$.

5. A flame retardant composition comprising a resin or rubber and the composite metal hydroxide according to claim 4 within a range of 80 to 150 parts by weight based on 100 parts by weight of the resin or rubber.

* * * * *